May 2, 1933. H. J. WOOCK 1,907,026
METHOD OF ADJUSTING A TIRE RETREADING MOLD TO DIFFERENT SIZES OF TIRES
Filed Feb. 27, 1929 3 Sheets-Sheet 2
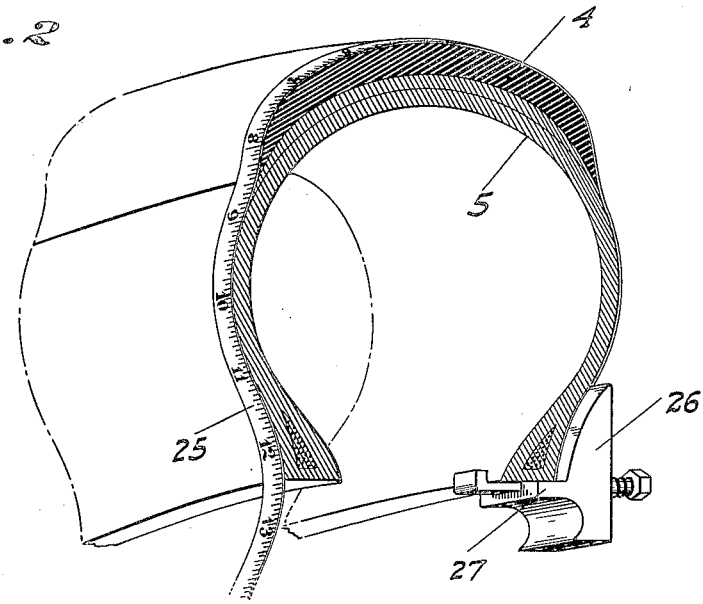
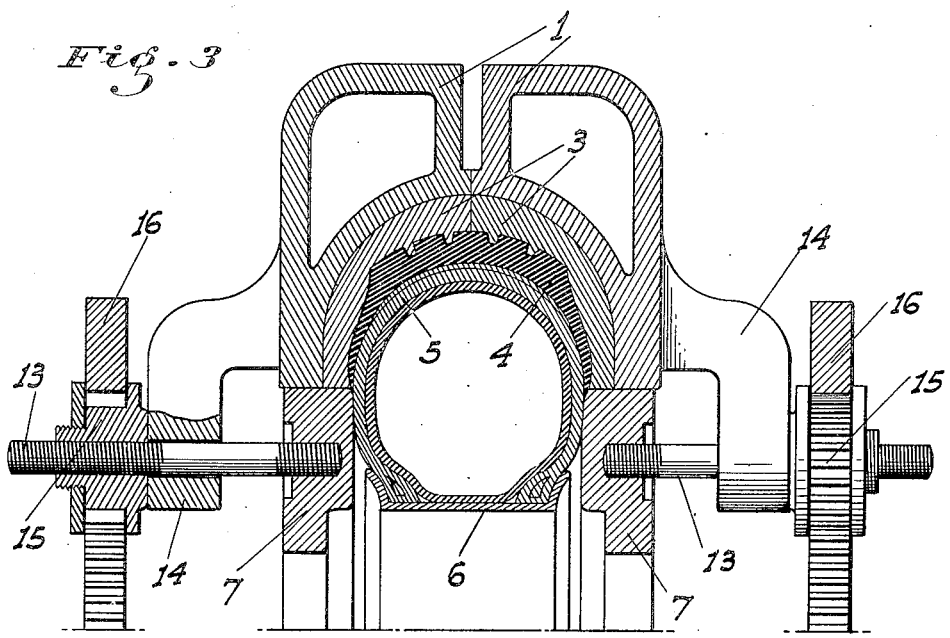
INVENTOR
*H. J. Woock*
BY
ATTORNEY May 2, 1933.                H. J. WOOCK                1,907,026
METHOD OF ADJUSTING A TIRE RETREADING MOLD TO DIFFERENT SIZES OF TIRES
                    Filed Feb. 27, 1929         3 Sheets-Sheet 3

Fig. 4

— INDEX —
for
Standard Balloons.

| Rim Dia. | Tire Size | Matrix Used | Group No. | Chart No. |
|----------|-----------|-------------|-----------|-----------|
| 18" | 28x5.25 | 300 | 1 | 18-5 |
| 18" | 30x6.00 | 300 | 3-4 | 18-5 |
| 18 | 30x6.75 | 300 | 7 | 18-5 |
| ----- | --- | ---- | ---- | ----- |
| 19 | 28x4.75 | 300 | 1 | 19-4 |
| 19 | 29x5.00 | 300 | 1-2 | 19-4 |
| 19 | 29x5.50 | 400 | 5 | 19-4 |
| 19 | 31x6.00 | 400 | 7 | 19-4 |
| 19 | 31x6.75 | 500 | 11 | 19-6 |
| 20 | 29x4.75 | 300 | 1-2 | 20-5 |
| 20 | 29x4.95 | 300 | 3 | 20-5 |
| 20 | 30x5.00 | 300 | 3 | 20-5 |
| ----- | --- | ---- | ---- | ----- |

Fig. 5

OPERATING CHART - No. 20-5
— FIRESTONE —
Rim Dia. 20"

| 300 Matrix | | Tread Width 5-1/8" | | | | Group No. 1 | | |
|---|---|---|---|---|---|---|---|---|
| RW | PP | 45 | 43 | 41 | 39 | 37 | 35 | 33 | 31 |
| 4½ | TM | 12 | 12-1 | 12-2 | 12-3 | 12-4 | 12-5 | 12-6 | 12-7 |
| 4 | TM | 12-4 | 12-5 | 12-6 | 12-7 | 12-8 | 12-9 | 12-10 | 12-11 |
| 3½ | TM | 12-7 | 12-8 | 12-9 | 12-10 | 12-11 | 12-12 | 12-13 | 12-14 |

INVENTOR
H. J. Woock.
BY
ATTORNEY

Patented May 2, 1933

1,907,026

UNITED STATES PATENT OFFICE

HERBERT J. WOOCK, OF LODI, CALIFORNIA, ASSIGNOR TO SUPER MOLD CORPORATION, OF RENO, NEVADA, A CORPORATION

METHOD OF ADJUSTING A TIRE RETREADING MOLD TO DIFFERENT SIZES OF TIRES

Application filed February 27, 1929. Serial No. 343,098.

This invention relates to the tire retreading industry, my principal object being to provide a method initial operation, in connection with the placing of the individual tires into a full-circle mold so that the tires will properly fit into the mold without being either buckled by too tight a fit or on the other hand without being unduly loose, such as causes the tread to be spongy and generally unsatisfactory.

To appreciate the necessity and value of my method it is advisable to set forth certain conditions which tire retreaders are confronted with and which must be properly met if retreading operations are to be successful and commercially practicable.

Each tire manufacturer makes a number of tires of different sizes both with respect to rim size, external diameter and cross sectional diameter. Such different sizes are theoretically standard with the different makers and it might be (and previously has been) assumed that a tire listed as 5 x 29 to fit an 18″ rim for instance would measure the same in all dimensions whether turned out by one manufacturer or by another. I have found from considerable experimentation however that such is not the case and tires of the same nominal sizes, as manufactured by the different companies, will vary considerably in their cross sectional peripheral measurements; and the only given dimension which can be relied on as being the same in all cases is the inner or rim fitting diameter, where the tire is always rigid on account of the reinforced and unstretchable beads.

These are conditions which I have found to exist in new tires and when the tires are turned in for retreading after having been used for a good many miles such conditions are apt to be exaggerated and to further make a wide variation in size between two tires of apparently the same size. This is because during the period of use of different tires of the same nominal size, one tire is apt to be kept inflated by its owner at a relatively high pressure and thus stretched considerably, while another may have been inflated at a low pressure so that the stretch is negligible. Also road an climatic conditions under which different tires are operated have considerable bearing on the ultimate cross sectional sizes of tires when they are finally turned in for retreading.

Due to the above conditions variations as much as ¾″ in peripheral measurement have been found to exist between tires of the same nominal sizes.

When retreading a tire it must fit snugly into the mold in order to obtain the necessary firmness and proper vulcanizing of the tread onto the carcass. This proper fit depends of course not only on the external diameter of the mold but on the cross sectional area included by the mold as well; and while variations of $\frac{3}{16}$″ between the peripheral cross sectional extent of the mold and that of the tire will not seriously affect the results, a greater variation than this prevents satisfactory results being obtained.

It is theoretically possible of course to provide removable tire surrounding matrices for the mold, made of different sizes to take care of all variations in tire sizes, but since such variations in tire sizes are so numerous and are spread over such a great number of different sized tires, this would entail such an expense for spare parts as would render the cost or retreading operations prohibitive.

The mold used in connection with my method therefore is one arranged to receive a number of different sized tread-design matrices, to conform to the tread design of different standard tires and to the external diameters and tread widths of different sizes of tires; and having adjustable side pressure plates disposed inwardly of the matrix. These plates enable the cross sectional area included between the matrix, said plates, and the rim on which the tire being retreaded is mounted, to be easily altered as may be necessary so that the tire will have the desired snug fit in the mold. When the tire is in place in the mold it is practically enclosed and the tread and adjacent side wall portions thereof cannot be seen. If therefore the pressure plates are adjusted at random or by guesswork it is practically impossible to tell whether such adjustment is too much or insufficient. If the plates are moved in too much the cross sectional area of the mold is unduly restricted and the tire will be buckled. If, on the other hand, the plates are not moved in enough the mold area will be too great for the tire and the tread will not be properly compressed in the matrix.

I have therefore worked out a chart for each make of tire, and for all sizes of such make, for enabling the proper adjustment of the pressure plates to be easily made for any individual tire being retreaded, as will be hereinafter seen.

A set of such charts or those relating to the particular makes of tire being retreaded by the operator of a mold is supplied to said operator, as well as a set of the necessary tread design matrices of different sizes. The chart and the instructions for the use of the same are so arranged that any person of ordinary intelligence can use the chart without trouble and thus turn out satisfactory retreads.

These objects I accomplish by means of such structure and relative arrangement of parts as will fully appear by a perusal of the following specification and claims.

In the drawings similar characters of reference indicate corresponding parts in the several views:

Fig. 2 is a cross section of a tire showing the method of measuring the cross sectional peripheral extent thereof.

Figure 1:
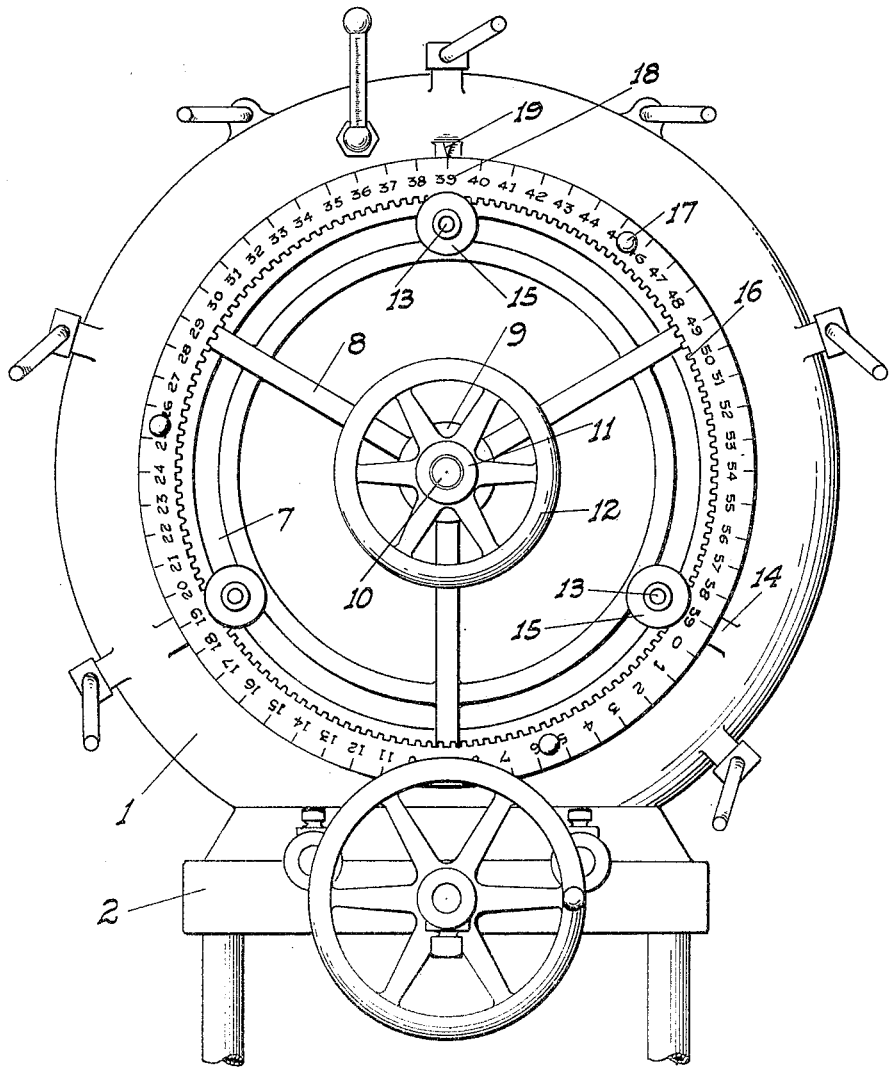
Fig. 1 is a front elevation of the preferred type of retreading mold used in connection with my method.

Fig. 3 is a fragmentary cross section of the mold showing the tire in place and the pressure plates properly adjusted.

Fig. 4 is a fragmentary view of a chart index sheet.

Fig. 5 is a fragmentary view of a main chart sheet.

Referring now more particularly to the characters of reference on the drawings, the mold is of the full-circle type and particularly such as that shown in my co-pending application for patent, Serial No. 317,515, filed November 6th, 1928. This mold comprises essentially a pair of separable annular mold sections supported in a vertical position on a frame 2, which sections are movable to and from each other and are clamped against movement when brought together by any suitable means. Annular matrix sections 3 having the design of the tread portion 4 of a tire 5 formed therein are removably mounted in the mold sections, said matrix and mold sections extending inwardly to a point adjacent the central frictional plane of the tire, or substantially to the base of the tread portion thereof. The tire when placed in the mold is mounted on an ordinary rim 6 and the sides of the tire then project inwardly of the mold.

Slidably fitting the inner periphery of the mold sections and matrices are opposed rigid rings 7, whose inner faces are adapted to engage the sides of the tire between the tread and the rim engaging portion thereof. The rings are preferably provided with rigid spiders 8 formed therewith through the hubs 9 of which a shaft 10 passes. This shaft is detachably connected at one end to one spider, while its other end is threaded and engaged by the hub 11 of a hand wheel 12. By turning the wheel one way or the other the rings are moved to and from each other, as will be evident.

Projecting outwardly from each ring parallel to the shaft 10 is a plurality of threaded studs or pins 13, which are slidable through rigid lugs 14 secured to the mold and spaced sufficiently from the plane of the outside of the mold to enable the ring to be retracted from the tire a certain distance, since the lugs naturally project into the path of movement of the ring. Full shrouded pinions 15 are threaded on the studs outwardly of the lugs, all said pinions being engaged in common by and supporting an internal ring gear 16 which is held in constant mesh with the pinions by the shrouds thereof. The ring gear is provided with suitable handles 17 and is arbitrarily graduated about its outer face as shown at 18, said graduations being arranged to read against any fixed mark on the mold, such as is indicated at 19.

By reason of the above arrangement it will be seen that the pinions in effect are stops to engage the lugs when the rings have been moved toward each other a certain distance and thereby limiting such movement of the rings. It will also be seen that by turning the ring gear the pinions will be rotated, and being threaded on the studs will be moved lengthwise thereon and all to the same extent. Consequently the distance between the adjacent faces of the pinions and ring, and between which the lugs project will be correspondingly altered. The employment of the adjustable stop members and the operating means on both rings, insures that the rings will be symmetrically disposed relative to the central transverse plane of the mold when brought together to their limit of movement by the rotation of the hand wheel.

In connection with this apparatus the chart comprises main chart sheets 20, each of which is numbered and having data thereon arranged in the form of separated groups, each one of which deals with tires of a certain rim diameter and tread width, and nominal cross sectional size. Each group shows, in the form of horizontal rows of figures as at 21, all possible variations in cross sectional peripheral measurements of tires of such nominal size, given in inches and fractions in successively increasing order, and arranged for different rim widths suitable for such tires. The figures in the row pertaining to the large rim size are of smaller relative dimensions than those for the small rim sizes. These different rows form a number of vertical columns as shown, each column being headed by a number as at 22 which corresponds to the graduations on the rings 7, and indicates to what extent the rings must be turned to give the desired mold area. The relation between the various measurement sizes in the different columns and the rim sizes is such that one ring adjustment figure is common to all the measurements in such column. This can be done because the side walls of a large measure tire placed on a small rim would be separated the same extent as the side walls of a relatively small measure tire placed on a large rim, and the area displaced in the mold would be the same. Also it will be evident that the actual cross sectional exterior measurement of a tire will be the same whether the beads are pulled together somewhat by being confined in a 3½" rim or are separated by placing them in a 4½" rim. At the same time such different sized rims cause the side walls of the tire to be separated different distances from each other. The same measurement may therefore appear in various columns in the same chart group, in connection with different rim sizes and different pressure plate adjustments to offset this difference in separation between the side walls.

In connection with each group measurement and ring adjustment figures, the size of the matrix to be used is given as an arbitrary number as at 23. Also in connection with the various chart sheets an index sheet 24 is provided to enable the user to locate the necessary chart sheet and group from the main tire data in a quick and ready manner.

When preparing the tire 5 for placement in the mold the tread rubber 4 is first cemented thereabout as usual, and before placing the tire in the rim the extent of cross sectional periphery of the same from bead to bead is measured. This is preferably done by means of a flexible steel tape 25 attached at one end to a block 26 which is curved on one face to follow the exterior curvature of a bead and has a shoulder 27 projecting under the bead, so that the block may be easily located and held in a fixed position against the tire; the junction of the shoulder and the curving face of the block forming the zero or starting point for the tape graduations. The tape is placed about the tire and is bent to closely follow the curving contour of the tire at all points. The reading from the tape is taken at the point where the tape crosses the bottom edge of the bead and as shown reads "12 $\frac{7}{16}$" (printed as 12.7 on the chart).

Bearing this measurement in mind and knowing the rim diameter and the normal exterior and cross sectional diameters of the tire from the data embossed on the side walls thereof as usual, the operator consults the index sheet of the chart to determine on which chart sheet he will find the data which provides him with the proper ring adjustment figure.

Assuming that the tire being worked on is normally a 29 x 4.75 size, for a 20" rim, the corresponding data on the index sheet is found, which shows that groups 1–2 on chart sheet No. 20–5 are to be referred to. Turning to said sheet the operator looks over the rows of figures in the groups in question to find the measurement "12.7". This figure being located in two places the operator finds that he may mount the tire on a 4½" rim and adjust the pressure plates 7 to "31"; or he may place the tire on a 4" rim and adjust the plates to "39". (In the chart the abreviations "TM" and "PP" mean "tape measurement" and "pressure plates" respectively). The tire is then mounted on the rim 6 of the size chosen, placed in the mold and the pressure plates adjusted so that the number corresponding to the chosen rim size alines with the pointer 19. The vulcanizing operations can then be followed out with the assurance that the tire has a proper fit in the mold to obtain the best results.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

That method of fitting a tire to an adjustable tire mold consisting in the steps of first determining the actual outside peripheral measurement of the tire, placing the tire in the mold, and then adjusting the mold so that the interior peripheral measurement thereof is the same as that determined as the actual outside peripheral measurement of the tire, whereby when the tire is inflated under pressure within the mold it will be incapable of either stretching or buckling therein.

In testimony whereof I affix my signature.

HERBERT J. WOOCK.